United States Patent

Cunningham et al.

[11] 4,416,469
[45] Nov. 22, 1983

[54] PASSIVE SAFETY BELT SYSTEM

[75] Inventors: Douglas J. Cunningham, Lutterworth; George G. Sanders, Polesworth, both of England

[73] Assignee: Britax (Wingard) Limited, Birmingham, England

[21] Appl. No.: 256,530

[22] Filed: Apr. 22, 1981

[30] Foreign Application Priority Data

| Apr. 30, 1980 | [GB] | United Kingdom | 8014158 |
| May 13, 1980 | [GB] | United Kingdom | 8015857 |
| Sep. 12, 1980 | [GB] | United Kingdom | 8029601 |
| Oct. 8, 1980 | [GB] | United Kingdom | 8032288 |

[51] Int. Cl.$^3$ .......................................... B60K 21/10
[52] U.S. Cl. .................................. 280/804; 297/468
[58] Field of Search ............... 280/802, 803, 804, 807, 280/808; 297/468, 469, 481

[56] References Cited

U.S. PATENT DOCUMENTS

| 3,727,944 | 4/1973 | Wize | 280/802 |
| 3,743,319 | 7/1973 | Winchell | 280/803 |
| 3,815,934 | 6/1974 | Weststrate | 280/803 |
| 3,827,714 | 8/1974 | Lefeuvre | 280/804 |
| 3,850,446 | 11/1974 | Hogensen | 280/802 |
| 3,994,513 | 11/1976 | Courtis | 280/808 |
| 4,124,224 | 11/1978 | Matsuoka | 280/802 |
| 4,189,170 | 2/1980 | Tanaka | 280/802 |
| 4,190,267 | 2/1980 | Stephenson | 280/803 |
| 4,201,401 | 5/1980 | Brynn | 280/803 |
| 4,225,156 | 9/1980 | Barnett | 280/808 |
| 4,231,590 | 11/1980 | Magane | 280/803 |
| 4,235,456 | 11/1980 | Shakespear | 280/804 |
| 4,324,418 | 4/1982 | Stephenson | 280/802 |

FOREIGN PATENT DOCUMENTS 2214776 3/1972 Fed. Rep. of Germany .
2006610 5/1979 United Kingdom .

Primary Examiner—Bruce H. Stoner, Jr.
Assistant Examiner—John A. Carroll
Attorney, Agent, or Firm—Hayes, Davis & Soloway

[57] ABSTRACT

In a motor vehicle having a front-hinged door 26 and an adjacent seat 10, a safety belt system, the safety belt comprises a lap strap 14, a shoulder strap 16 and a common strap 20 interconnected to form a three point safety belt. The free ends of the lap and shoulder straps 14 and 16 are connected to the rear edge of the door 26. The common strap 20 is connected to an inertia reel 28 mounted inboard of and adjacent to the bottom of the back of the seat 26. A puller strap 30 interconnects a point 18 on the safety belt with a point 32 on the vehicle so that, when the door 26 is opened the puller strap 30 applies a force to the shoulder strap 16, thereby displacing the junction 18 between the lap, shoulder and common straps 14, 16 and 20 out of the plane containing their anchorages 22 and 24 and the inertia reel 28.

8 Claims, 14 Drawing Figures

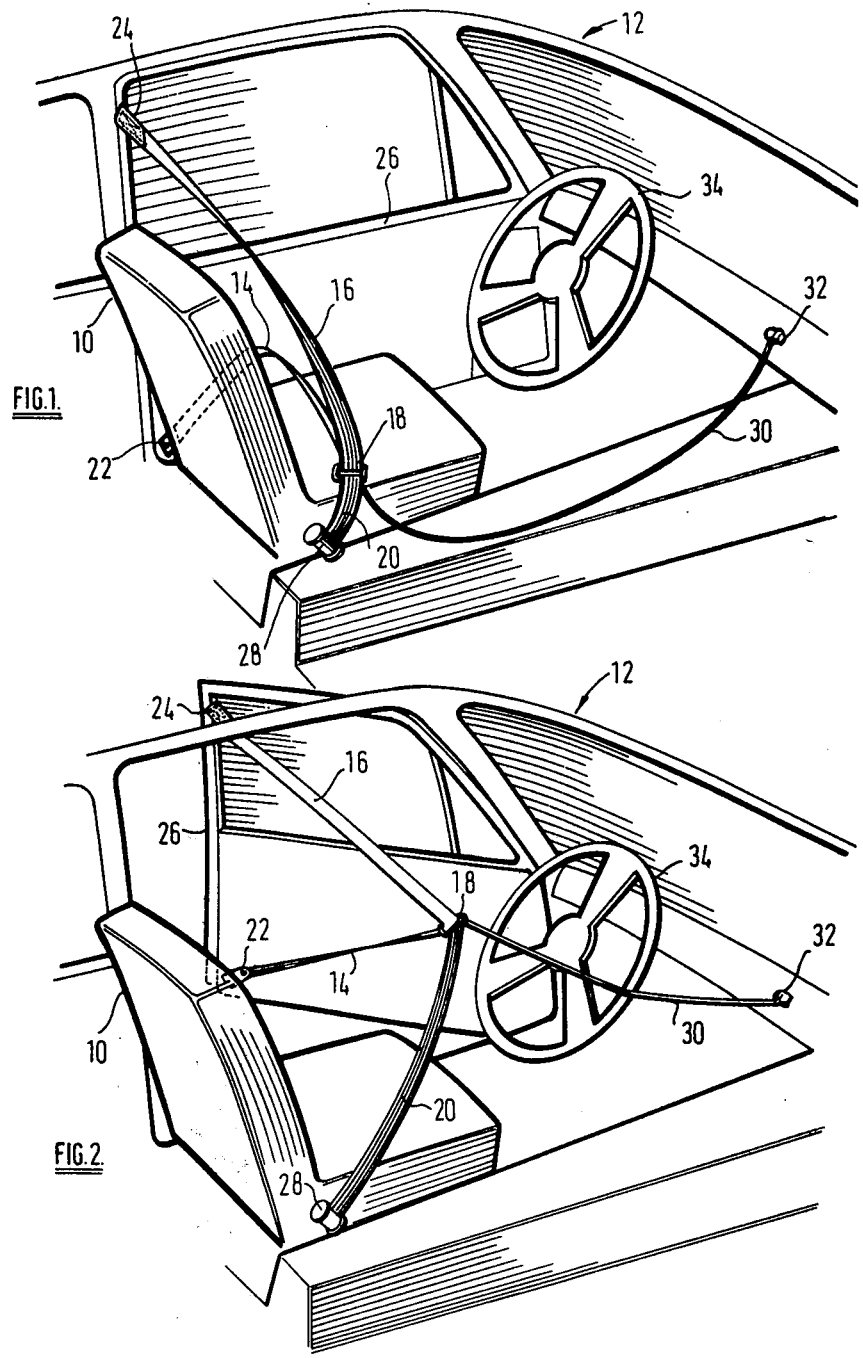

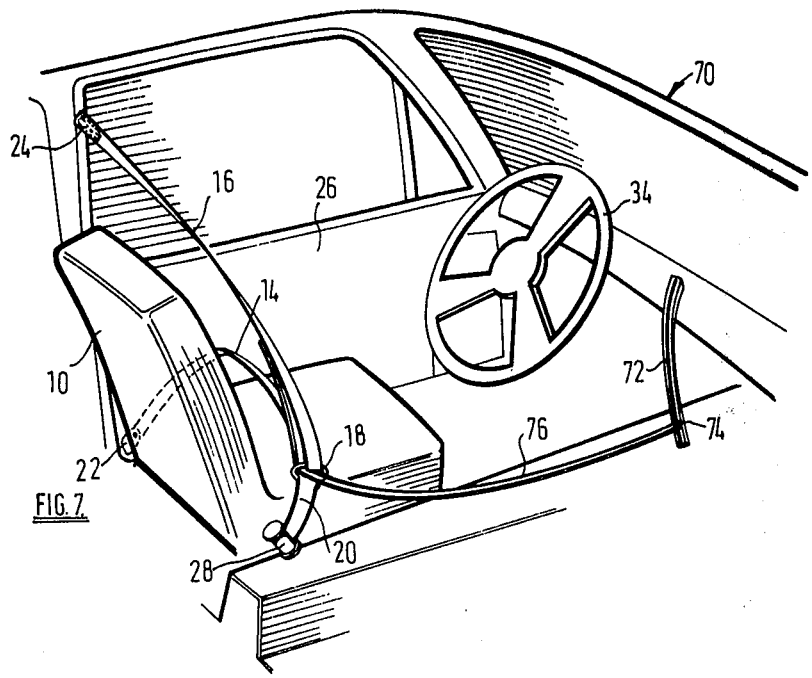
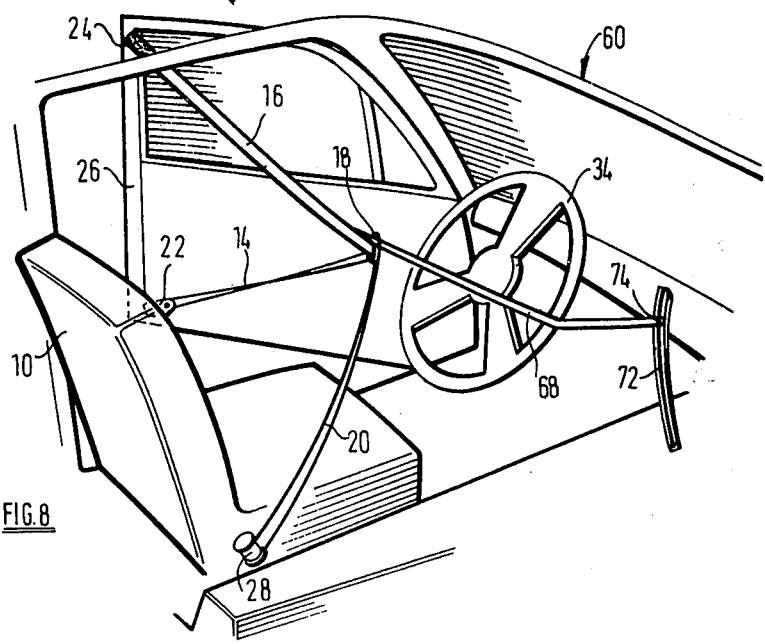

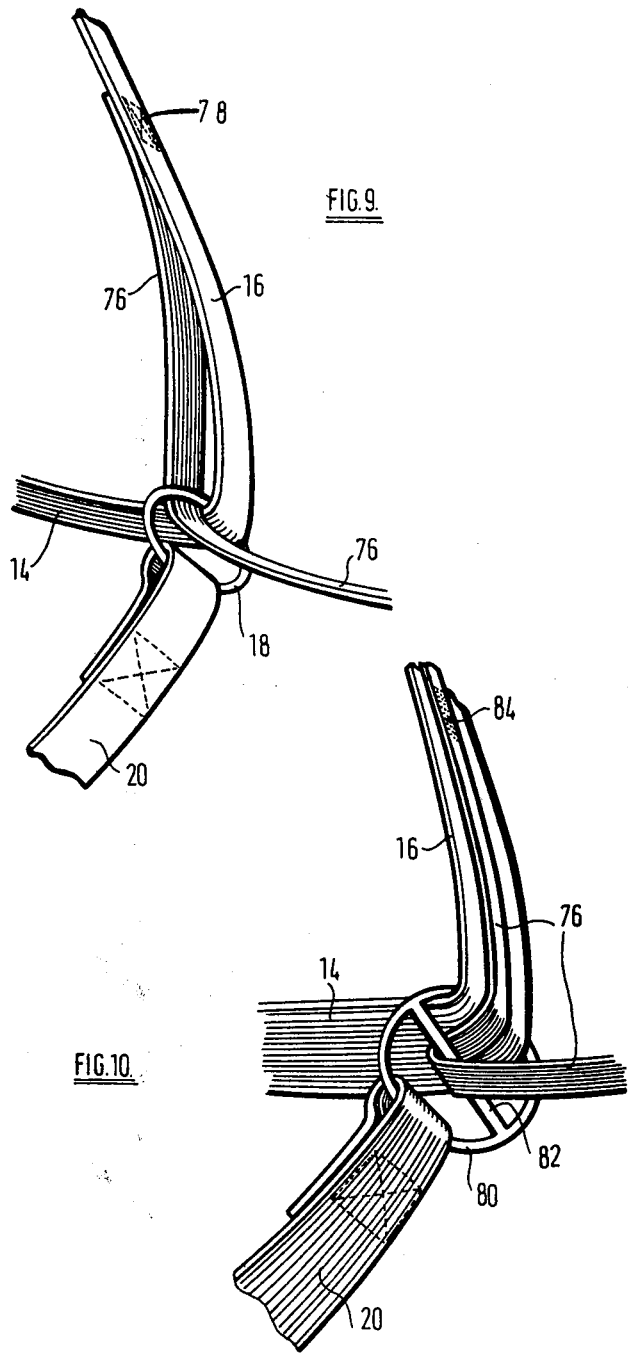

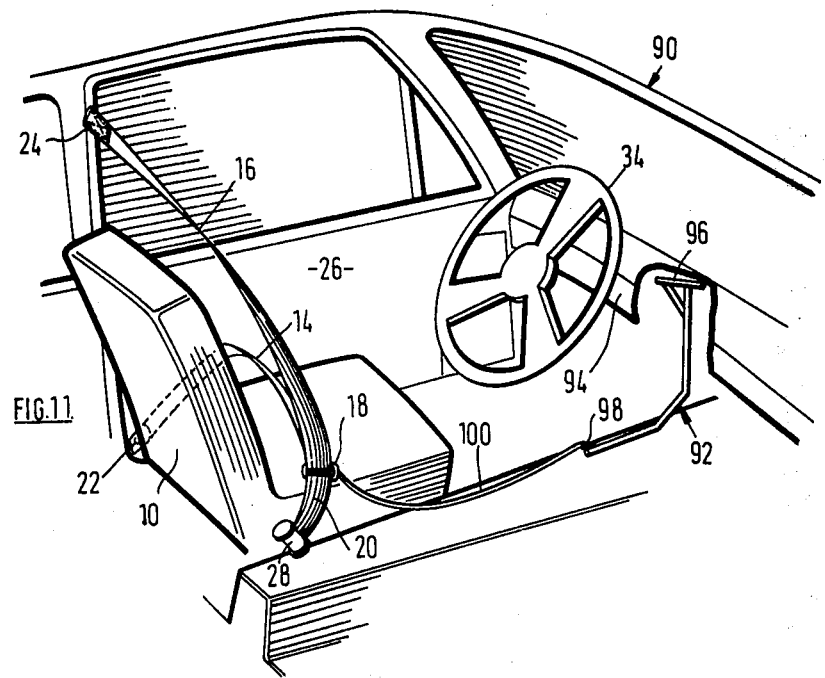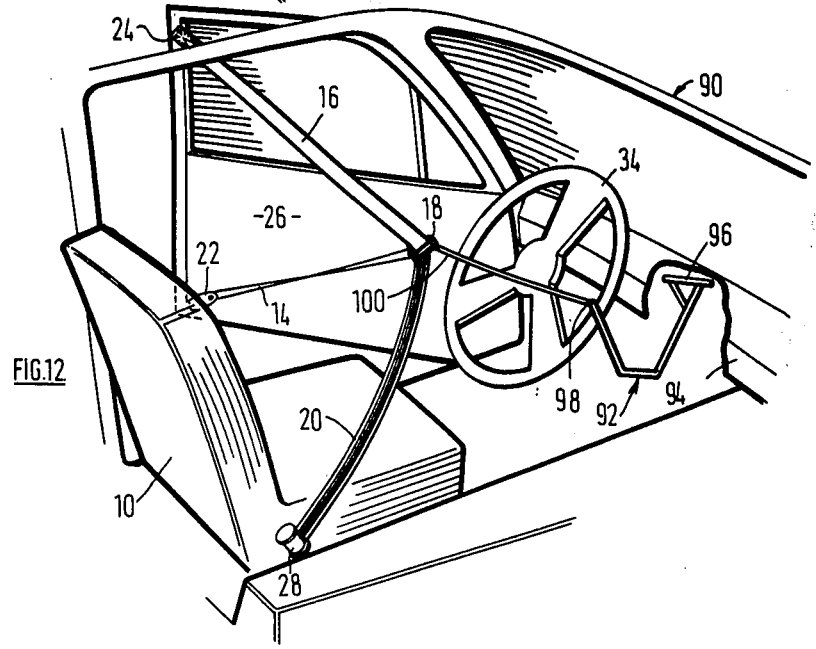

PASSIVE SAFETY BELT SYSTEM

This invention relates to a passive safety belt system for a motor vehicle of the type in which the belt is moved away from the body of the user when the corresponding vehicle door is opened.

It is an object of the present invention to provide a system of the foregoing type in which the power used to move the safety belt is derived from the opening and closing movement of the vehicle door.

According to the invention, a motor vehicle has a front-hinged door and an adjacent seat provided with a safety belt system comprising a shoulder strap, a lap strap and a common strap interconnected to form a three-point safety belt, the free ends of the shoulder, lap and common straps being connected to respective anchorage means, one of which incorporates an inertia reel, the anchorage means for the lap strap and the common strap each being connected to a respective one of a first point on the door in proximity to the bottom rear corner thereof and a location on the vehicle inboard of and adjacent to the bottom of the back of the seat and the anchorage means for the shoulder strap being connected to a point above the anchorage means for the lap strap such that its location relative to the anchorage means for the lap strap is not affected by opening of the door, the safety belt system further comprising puller means interconnecting a point on the safety belt with a point on the vehicle such that, when the door is opened the puller means applies a force to the shoulder strap thereby to displace the junction between the lap, shoulder and common straps out of the plane containing the two anchorage means and the guide means in a direction away from the seat.

Preferably the inertia reel forms part of the anchorage for the common strap and the puller means is of constant length.

When the invention is applied to a safety belt system of the type in which the lap and shoulder straps are attached to the rear edge of the door, the puller means may be arranged to interconnect a point on the safety belt which is inboard of the seat when the door is closed and a point on the vehicle in front of and above the knees of an occupant of the seat.

In one form of the invention, the puller means comprises a flexible element made, for example, of webbing or cord.

In another form of the invention, the puller means comprises a rigid element such as a rod which may be bent at an intermediate point along its length to facilitate movement around the steering wheel of the vehicle.

The point on the vehicle to which the puller means is connected may be a fixed location on the fascia immediately below the windscreen. Alternatively, the point may be movable, for example in the form of a slider mounted on a track, the end of which nearer to the door is higher than the other end, or the end of an arm mounted on a transverse pivot axis, the end of which nearer the door is lower than the other end.

In a preferred form of the invention the lap and shoulder straps are formed as a single continuous length running freely through a guide member which is attached to the end of the common strap, and the puller means comprises a flexible element running freely through the guide member and attached to the shoulder strap at a point spaced from the guide member. The guide member may comprise a ring which need not be circular. Alternatively, it may be a more complex component having separate apertures for the lap and shoulder straps and the puller member respectively.

When the invention is applied to a safety belt system of the type in which the lap and shoulder elements are anchored inboard of the seat and the guide means, together with the inertia reel are mounted on the door, the puller means may interconnect the junction between the lap, shoulder and common straps and a runner movable along a track which extends forwardly from a point on the door in proximity to the guide means so that, when the door is shut, the puller means does not obstruct winding of the common strap onto the inertia reel. A system of this type is particularly suited for use in a sports car where it is not feasible to provide a safety belt anchorage near the top rear corner of the door.

Preferably the track is in abutment with the door along its entire length, with its forward end in proximity to the bottom edge of the window in such door.

Embodiments of the invention will now be described, by way of example, with reference to the accompanying drawings, in which:

FIGS. 1 and 2 are perspective views of the interior of a motor car in accordance with a first embodiment of the invention, with the door adjacent to the seat provided with the safety belt closed and open respectively;

FIGS. 7 and 8 are perspective views, corresponding to FIGS. 1 and 2, of a fourth embodiment of the invention;

FIGS. 9 and 10 are perspective views, illustrating two alternative forms of guide member for use with the embodiment shown in FIGS. 7 and 8;

Figure 13:
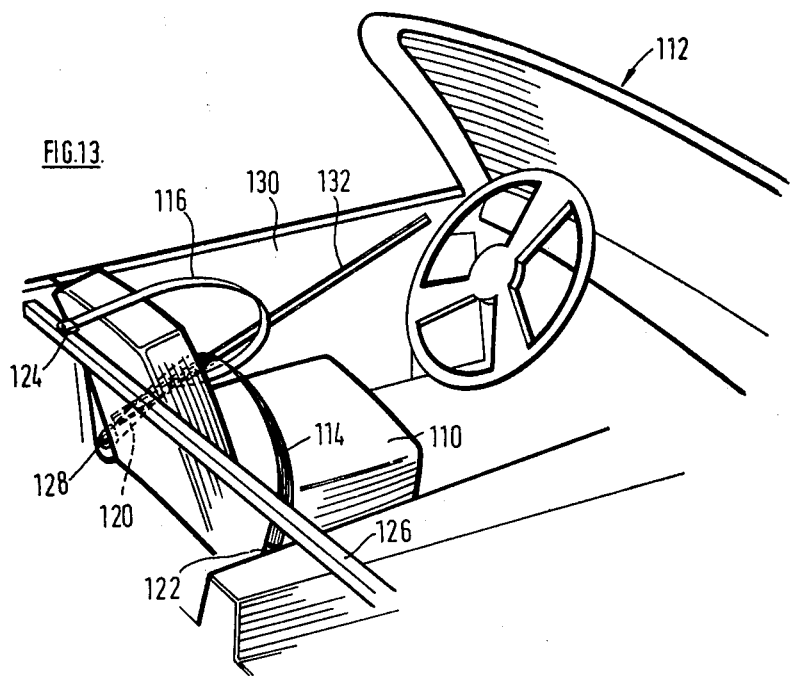
Figure 14:
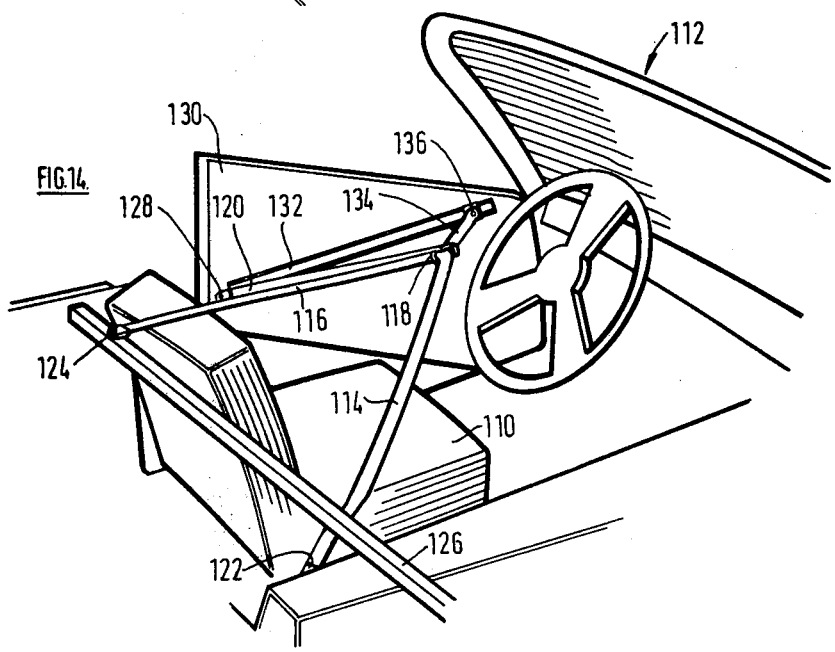

FIGS. 11 and 12 are perspective views, corresponding to FIGS. 1 and 2, of a fifth embodiment of the invention; and FIGS. 13 and 14 are perspective views, corresponding to FIGS. 1 and 2, of a sixth embodiment of the invention.

FIGS. 1 and 2 show the driver's seat 10 of a motor car 12 in accordance with the invention. A safety belt for the driver consists of a single length of webbing, forming the lap element 14 and the diagonal element 16 which runs freely through a flattened ring 18 connected to one end of another length of webbing forming the common element 20 of the safety belt. The free ends of the lap and diagonal elements 14 and 16 are connected to respective anchorages 22 and 24 near the bottom and top rear corners of the adjacent door 26 of the car. The free end of the common element 20 is connected to an inertia reel 28 mounted on the floor of the car on the inboard side of the seat 10 and adjacent to the back thereof.

In accordance with the invention, a piece of webbing 30 is connected between a point on the common element 20 adjacent to the ring 18 and a point 32 in the centre of the fascia just below the windscreen. The length of the webbing 30 is chosen so that it hangs in a position so as not to obstruct access to the handbrake and gear lever (not shown).

When the car door 26 is closed, the safety belt comprising the elements 14, 16 and 20 is in a configuration to be used by the driver of the car 12 and is not affected by the piece of webbing 30. When the door 26 is opened the resulting pull on the lap and diagonal elements 14 and 16, particularly the latter, causes webbing to be drawn off the reel 28. Initially the piece of webbing 30 has no effect but, when it tightens, it pulls the ring 18 and the adjacent elements of the safety belt away from the body of the driver until, when the door 26 is fully open, the safety belt is in the configuration shown in FIG. 2.

A similar system may be provided for the front seat passenger.

It will be appreciated that the choice of the length of the piece of webbing 30 is a compromise between not interfering with access to the handbrake and gear lever when the car door 26 is closed, which dictates that the length shall be as long as convenient, and maximising the extent to which the saftey belt is pulled away from the body of the driver when the door 26 is open, which dictates that the length should preferably be no longer than the distance between the point 32 and the rim of the steering wheel 34. This compromise can be improved by replacing the fixed anchorage point 32 with a moveable anchorage point.

Figure 3:
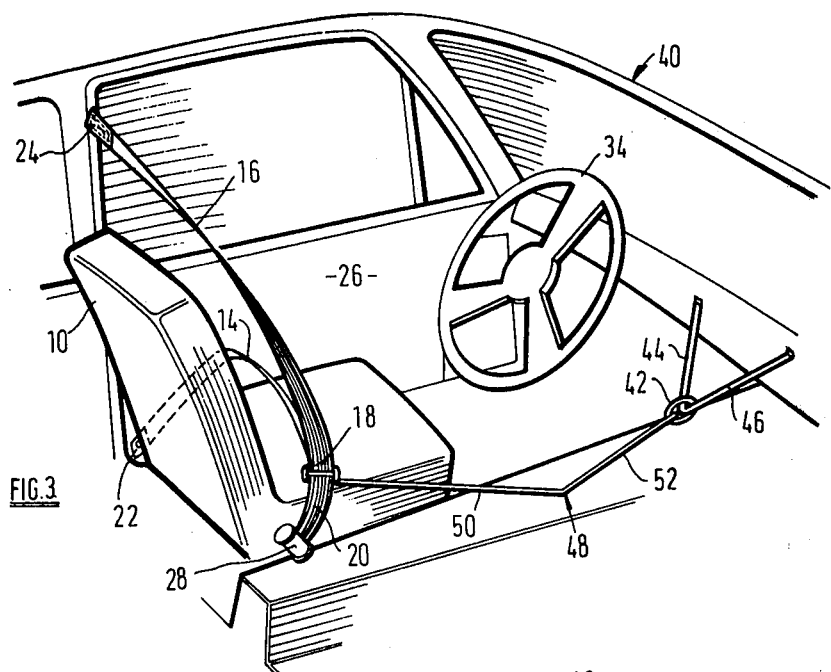
FIGS. 3 and 4 are perspective views, corresponding to FIGS. 1 and 2, of a second embodiment of the invention.
Figure 4:
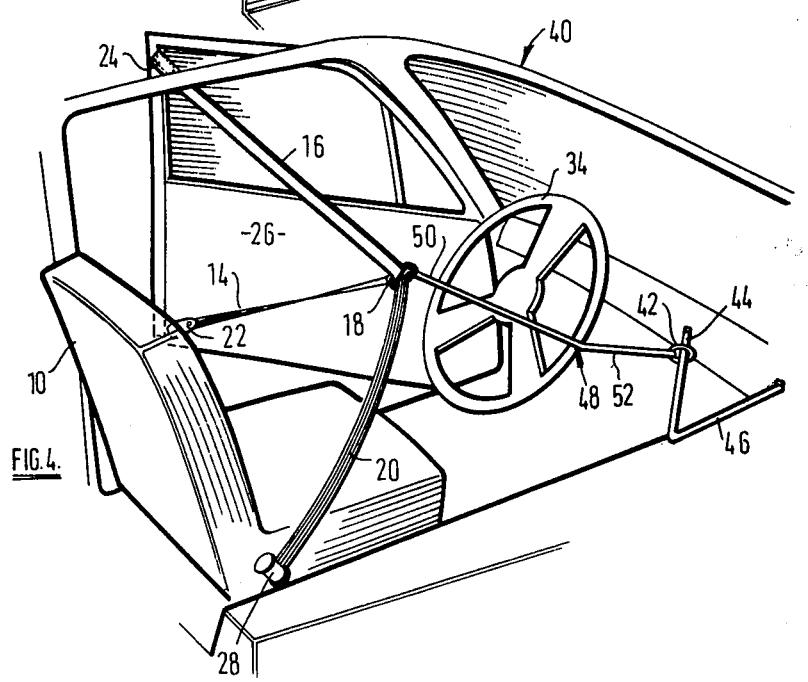

FIGS. 3 and 4 illustrate an alternative arrangement in which a movable anchorage point is provided, as applied to a car 40. Those parts of the system which are equivalent to corresponding parts of the system shown in FIGS. 1 and 2 are denoted by the same reference numerals and will not be described in detail.

The movable anchorage takes the form of a slider 42 mounted on a track member 44 which, together with a corresponding track member 46 of an equivalent system for the front passenger's seat (not shown) forms a V-shape projecting rearwardly and downwardly from the fascia. The slider 42 is connected to a point on the common element 20 of the safety belt adjacent to the ring 18 by a cranked rigid member 48 having a long limb 50 which, when the car door 26 is closed, as shown in FIG. 3, extends substantially forwardly from the common element 20 and a short limb 52 which is attached to the slider 42.

When the car door 26 is opened, webbing is pulled off the reel 28 as before. The cranked member 48 is lifted up by the saftey belt and the slider 42 travels along the track 44 until the cranked member 48 abuts against the steering wheel 34. The cranked member 48 then pivots on the edge of the steering wheel 34, to bring the short limb 52 thereof to a more horizontal orientation with the result that the end of the long limb 50 which is attached to the safety belt is drawn forwardly towards the steering wheel. Thus the cranked configuration of the member 48 serves both to improve access to the handbrake and gear lever (not shown) and to increase the distance by which the saftey belt is drawn away from the body of the driver.

The rigid member 48 may be replaced by a piece of webbing or other flexible connecting material if desired. Similarly, a rigid member may be used with the system of FIGS. 1 and 2.

Figure 5:
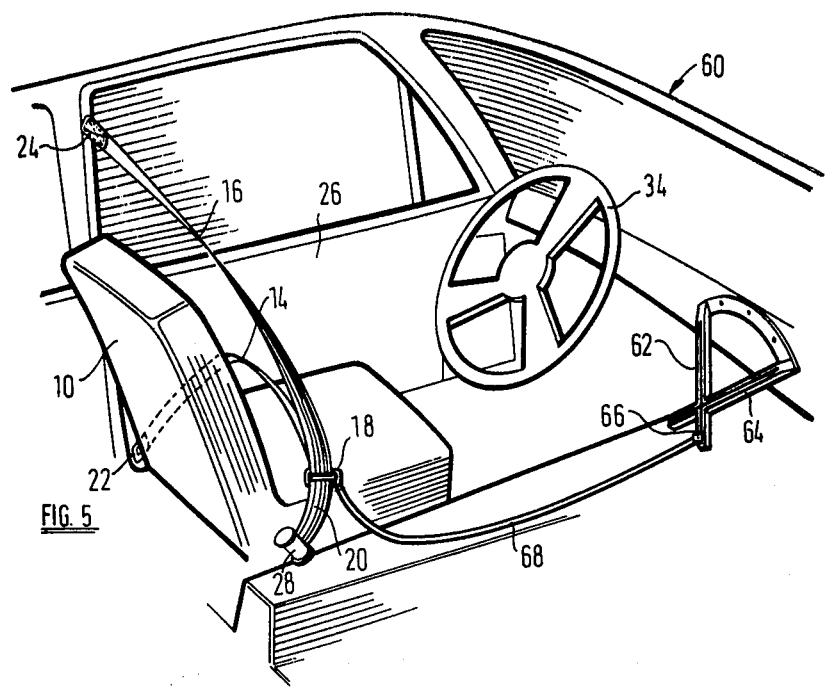
FIGS. 5 and 6 are perspective views, corresponding to FIGS. 1 and 2, of a third embodiment of the invention.
Figure 6:
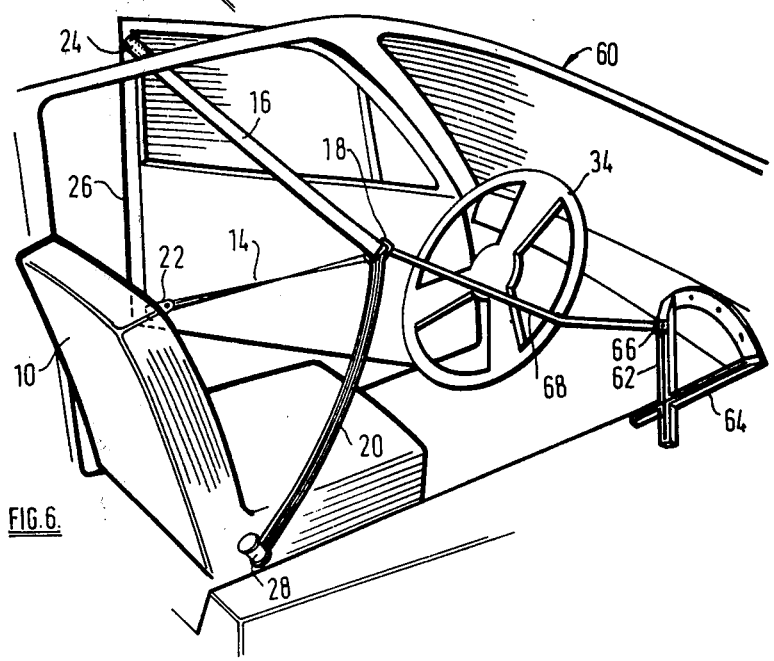

FIGS. 5 and 6 illustrate a car 60 fitted with another system in accordance with the invention. Once again, those parts which are equivalents to parts of the system shown in FIGS. 1 and 2 are denoted by the same reference numerals and will not be described in detail.

The V-shaped track arrangement, 44, 46 of the system shown in FIGS. 3 and 4 is replaced by an X-shaped track arrangement consisting of track members 62 and 64. The track member 62 carries a slider 66 which is connected by a piece of webbing 68 to the common element 20 of the safety belt adjacent to the ring 18. The track member 64 carries a slider (not shown) for a corresponding system for the front passenger's seat. The operation of the system is similar to that of the system shown in FIGS. 3 and 4, the crossing track members 62 and 64 not interferring with the operation because the webbing 68 extends from the slider 66 approximately in the plane of the X-shape.

The webbing 68 may be replaced by a rigid member suitably shaped to avoid interferring with the track member 64.

FIGS. 7, 8 and 9 illustrate a car 70 fitted with a further system in accordance with the invention. Once again, those parts which are equivalent to corresponding parts of the system shown in FIGS. 1 and 2 are denoted by the same reference numerals and will not be described in detail.

The V-shaped track arrangement 44, 46 of the system shown in FIGS. 3 and 4 is replaced by a similar track arrangement, consisting of two track members of which only the track member 72 is illustrated. The track member 72 is curved so that although its upper end region follows substantially the same path as that of the track member 44, its lower end region is displaced forwardly so as not to project as far back in the car towards the seats. The track member 72 carries a slider 74 which is connected to a piece of webbing 76. The piece of webbing 76 is threaded through the ring 18 and stitched to the diagonal element 16 at a point 80 (FIG. 9) which is spaced apart from the ring 18.

When the door 26 is fully open, as shown in FIG. 8, the piece of webbing 76 pulls some of the diagonal element 16 through the ring 18 so as to effectively increase the length of the lap element 14. This prevents the lap element 14 from pulling the ring 18 downwards, with the result that it is located substantially on a straight line between the slider 74 and the anchorage 24 at the top rear corner of the door 26 (compare FIG. 6).

FIG. 9 shows the parts of the saftey belt immediately adjacent to the ring in more detail, with the door in a half open position. It will be seen that the flexible element 76 is stitched to the side of the diagonal element 16 which faces the user's body so as to be appropriately positioned to run through the ring 18 without interferring with the co-operation between the latter and the three elements 14, 16 and 20 of the safety belt when the door is closed.

FIG. 10 illustrates an alternative guide member 80 for connecting the three elements of the safety belt and the piece of webbing 76 for use in place of the ring 18. The guide member 80 consists of a ring having a cross-bar 82 thereby providing three separate transverse elements round which the lap and diagonal elements 14 and 16, the common element 20 and the piece of webbing 76 can be led. This allows the piece of webbing 76 to be stitched, at a point 84, on the opposite side to that of the user's body in use.

FIGS. 11 and 12 illustrate a car 90 fitted with another system in accordance with the invention. Once again, those parts which are equivalent to corresponding parts of the system shown in FIGS. 1 and 2 are denoted by the same reference numerals and will not be described in detail.

The curved track members of the system shown in FIGS. 7 and 8 are replaced by a cranked lever 92 which is pivotally mounted beneath the fascia 94 of the car 90. The fascia 94 is shown broken away and, as can be seen, the axle 96 on which the lever 92 is mounted extends generally transversely of the car 90 but its end nearer the door 26 is lower than its other end. The effect of this is that, as the lever 92 pivots upwardly from the position shown in FIG. 11 to the position shown in FIG. 12, its outer end 98 moves closer to the door 26. The free end 98 of the lever 92 is connected to the ring 18 by a piece of webbing 100, similar to the piece of webbing 96 of FIGS. 7 and 8. Preferably, the piece of webbing 100 extends through the ring 18 and is stitched to the diagonal element 16 at a point spaced apart from the ring 18, in a similar manner to that described with reference to FIGS. 9 and 10.

When the door 26 is opened, the diagonal element 16 of the safety belt pulls on the piece of webbing 100 which in turn pulls on the free end 98 of the lever 92. Because of the downward slope of the axle 96, the piece of webbing 100 exerts a force on the lever 92 with a sufficient component in a direction perpendicular to the axle 96 for the lever 92 to be lifted from the position shown in FIG. 11 to the position shown in FIG. 12. The cranked formation of the lever 92 enables it to perform this movement without being obstructed by the fascia 94. The free end 98 of the lever 92 thus follows a similar path to that of the slider 74 of FIGS. 7 and 8 but the system shown in FIGS. 11 and 12 has the advantage that it can be installed without requiring any modification of the fascia 94.

The foregoing embodiments of the invention are not suitable for use in an open top sports car because, in the absence of a B-post extending up to a cantrail, it is not feasible to provide a safety belt anchorage in proximity to the top rear corner of the vehicle door. FIGS. 13 and 14 show the driver's seat 110 of a motor car 112 in accordance with the invention. A safety belt for the driver consists of a single length of webbing forming the lap element 114 and the diagonal element 116 which runs freely through a flattened ring 118 connected to one end of another length of webbing forming the common element 120 of the safety belt. The free ends of the lap and diagonal elements 114 and 116 are connected to respective anchorages 122 and 124. The anchorage 122 is mounted on the transmission tunnel of the vehicle while the anchorage 124 is mounted on a transverse bar 126 which extends across the vehicle immediately behind the seats. In a two seater sports car, this bar 126 may conveniently form the support for a parcels shelf (not shown). The free end of the common element 120 is led through a guide 128 in proximity to the bottom rear corner of the adjacent door 130 on to an inertia reel (not shown) concealed behind the door trim panel.

In accordance with the invention, a track 132 is mounted on the door 130 so as to extend between a point adjacent to the guide 128 diagonally, forwardly and upwardly towards the top front corner of the door. A piece of webbing 134 extends between the ring 118 and a runner 136 which is slidably mounted on the track 132. The connection between the piece of webbing 134 and the diagonal element 116 may be similar to that illustrated in FIG. 9 or FIG. 10.

When the car door 130 is closed, the safety belt comprising the elements 114, 116 and 120 is in a configuration to be used by the driver of the car 12 and is not affected by the piece of webbing 134. When the door 130 is opened, the piece of webbing 134 pulls the slider 136 away from the end of the track 132 adjacent to the guide 128 and, at the same time, lifts the elements 114, 116 and 120 away from the body of the driver, freeing him to leave his seat. The length of the piece of webbing 134 is chosen to be such that, when the door 130 is fully opened, the diagonal element 116 and the piece of webbing 134 are in an approximately straight line between the anchorage 124 and the slider 136.

As an alternative to providing the transverse bar 126, the back of the seat 110 may be reinforced sufficiently to permit the anchorage 124 to be attached directly to it.

I claim:

1. For use in a motor vehicle having a steering wheel, a fascia forward of the steering wheel and a seat located adjacent to a front-hinged door, a passive safety belt system comprising:
   a shoulder strap, a lap strap and a common strap interconnected to form a three point safety belt;
   anchorage means for the free end of the shoulder strap connected to the door in proximity to the top rear corner thereof;
   anchorage means for the free end of the lap strap connected to the door in proximity to the bottom rear corner thereof;
   anchorage means for the free end of the common strap incorporating an inertia reel and connected to a location on the vehicle inboard of, and adjacent to the bottom of the back of, the seat; and
   puller means interconnecting a point on the safety belt which is inboard of the seat when the door is closed with a point on the vehicle which is forward of the seat in front of and above the normal position of knees of an occupant of the seat, said last mentioned point being forward of the steering wheel and closely adjacent to the fascia when the door is opened, so that, the force applied to the safety belt by the door, when it is opened, causes the puller means to apply a resilient force to the shoulder strap thereby to displace the junction between the lap, shoulder and common straps out of the plane containing said three anchorage means in a direction away from the seat.

2. A safety belt system according to claim 1, wherein the puller means is of constant length.

3. A safety belt system according to claim 1, wherein the inertia reel forms part of the anchorage for the common strap.

4. A safety belt system according to claim 1, wherein the puller means is connected to the vehicle at a fixed location on the fascia immediately below the windscreen.

5. A safety belt system according to claim 1, wherein the puller means is connected to the vehicle by means of a slider mounted on a track which is fixed to the vehicle with the end nearer to the door higher than the other end.

6. A safety belt system according to claim 1, wherein the puller means is connected to an arm which is mounted on the vehicle for movement relative to the vehicle about a transverse pivot axis the end of which nearer to the door is lower than the other end.

7. A safety belt system according to claim 1, wherein the puller means comprises a rigid element.

8. A safety belt system according to claim 7, wherein the rigid element is formed in two portions fixed at an angle one relative to the other.

* * * * *